United States Patent [19]

Tuohy, III

[11] Patent Number: 4,522,326

[45] Date of Patent: Jun. 11, 1985

[54] ROLLING TOOL BOX

[76] Inventor: Dennis J. Tuohy, III, 35 Wood Ave., Port Monmouth, N.J. 07758

[21] Appl. No.: 598,722

[22] Filed: Apr. 10, 1984

[51] Int. Cl.³ ............................................... B60P 1/52
[52] U.S. Cl. ..................................... 224/310; 296/37.6
[58] Field of Search ........................ 224/310, 311, 321; 296/37.6; 312/330 R, 332; 308/3.6, 3.8, DIG. 10, 3 R

[56] References Cited

U.S. PATENT DOCUMENTS

| 2,784,027 | 3/1957 | Temp | 296/37.6 X |
| 3,471,045 | 10/1969 | Panciocco | 296/37.6 X |
| 3,534,892 | 10/1970 | Truelove, Sr. | 224/311 |
| 3,640,423 | 2/1972 | Parker et al. | 296/37.6 X |
| 3,826,529 | 7/1974 | Wood | 296/37.6 |
| 3,880,458 | 4/1975 | Jackson | 296/37.6 X |
| 3,901,565 | 8/1975 | Hagen et al. | 312/332 X |
| 3,940,009 | 2/1976 | Szeles | 296/37.6 X |
| 4,085,961 | 4/1978 | Brown | 296/37.6 |
| 4,266,821 | 5/1981 | Gillet | 224/42.03 R X |

FOREIGN PATENT DOCUMENTS 3147104  3/1983  Fed. Rep. of Germany ...... 224/311

Primary Examiner—Stephen Marcus
Assistant Examiner—Robert Petrik

[57] ABSTRACT

This tool box serves to prevent a truck owner or user from climbing in and out of the truck for tools. Primarily, it consists of a frame having rollers which are received in a pair of channels fastened to the inside of the truck bed. It further includes a pole with a hook for pulling or pushing the box, and the pole also serves to render the box stationary when the truck is in motion.

1 Claim, 7 Drawing Figures

U.S. Patent   Jun. 11, 1985   4,522,326
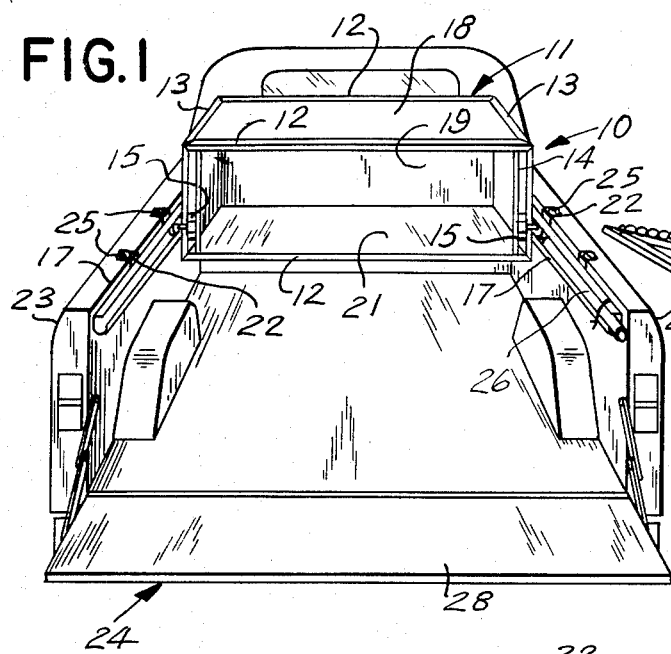
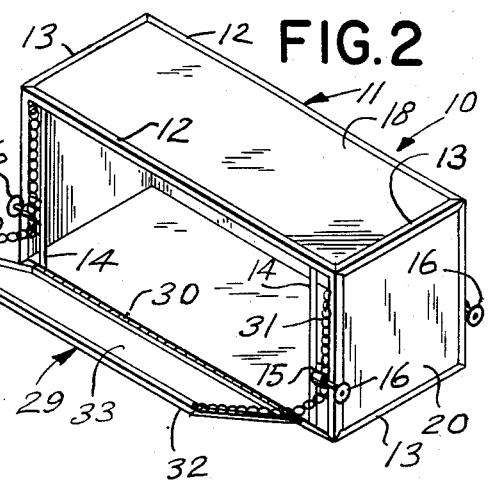
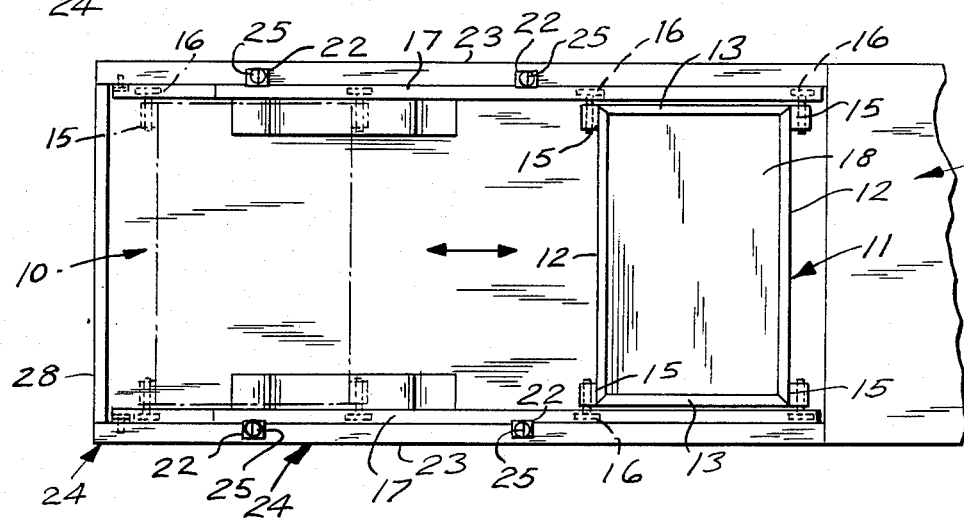
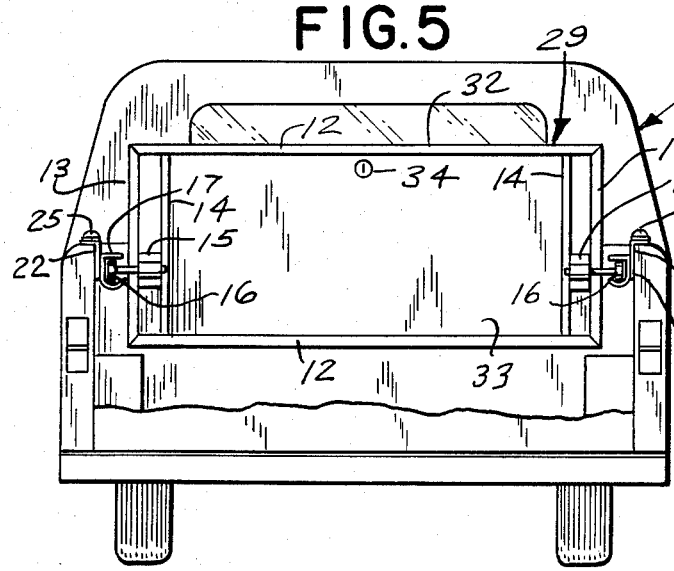
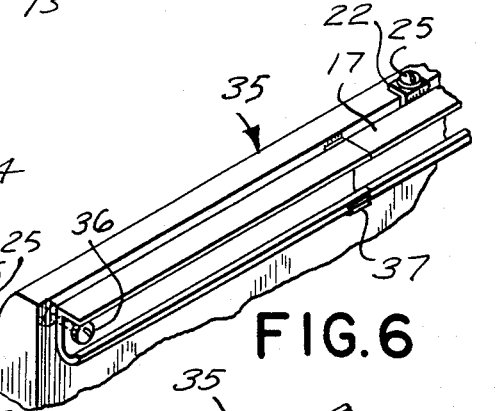
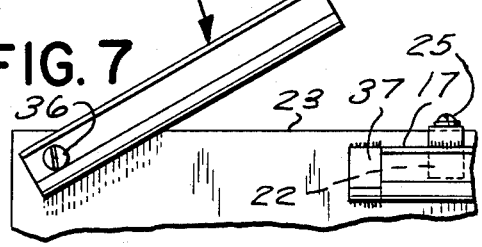

ROLLING TOOL BOX

This invention relates to tool receptacles, and more particularly to a rolling tool box.

The principal object of this invention is to provide a rolling tool box, which will be unique, in that it will be attached to the inside walls of the bed of a truck.

Another object of this invention is to provide a rolling tool box, which will prevent its user from having to climb in and out of the truck for his tools, and the box may be so fabricated, as to fit a truck of any size.

Another object of this invention is to provide a rolling tool box, which will include a pole for pushing or pulling the box to the front or rear of the truck, and the pole will also serve to retain the box in place when the Vehicle is being driven.

A further object of this invention is to provide a rolling tool box, which will include a plurality of rollers, that will be received in tracks mounted in the truck.

Other objects are to provide a rolling tool box, which is simple in design, inexpensive to manufacture, rugged in construction, easy to use, and efficient in operation.

These, and other objects, will be readily evident, upon a study of the following specification, and the accompanying drawing, wherein:

FIG. 1 is a perspective view of the present invention, shown in mounted condition;

FIG. 2 is a perspective view of a modified form of this invention, which is optional;

FIG. 3 is a fragmentary top plan view of the truck, showing the rear position of the box in phantom lines therein:

FIG. 4 is a side elevational view of the pole or rod of the invention;

FIG. 5 is a rear elevational view of the truck, showing its tailgate broken away, with the tool box rolled to the rear of the truck;

FIG. 6 is a fragmentary perspective view of a guide rail adapter for installing and removing the tool box, if a truck bed cap is used, and FIG. 7 is a fragmentary side elevational view of FIG. 6, showing the guide rail adapter raised for the installation or removal of the tool box if a cap is used.

Accordingly, a tool box 10 is shown to include a rectangular frame 11, which is fabricated of four parallel spaced top and bottom angle iron members 12, which are fixedly secured, at their ends, to eight similar side members 13. A pair of vertical members 14 are spaced from the ends of frame 11, and are fixedly secured, at their top and bottom ends, to the front members 12. Another pair of vertical members 14 are secured, in the same manner, to the rear members 12, and a roller plate 15 is fixedly secured between the members 14 and the side members 13 in the front and rear of frame 11. Roller plates 15 include an extending side roller 16, which is common in the art, and are in rolling engagement with roller guide channels 17, which hereinafter will be described. The frame 11 is covered with a top panel 18, a bottom panel, not shown, a rear panel 19, and a pair of side panels 20, which are of a suitable metal and are fixedly secured to frame 11 in a suitable manner (not shown). A plywood panel 21 is fixedly secured to the inside bottom of frame 11 in a suitable manner, for rigid support of the tools and other articles placed within box 11. The roller guide channels 17 are a pair, and each includes a pair of mounting brackets 22, which are fixedly secured to, and extending from, the rear surface of the channels 17. Each bracket 22 is secured to the top of the sides 23 of the bed of truck 24 by suitable fasteners 25, and a pole 26 is provided and includes a hook 27, which is fixedly secured in one end in a suitable manner. Pole 26 is used to pull box 10 to the rear of truck 24, by engaging its hook 27 to the frame 11, and it is also used to push box 10 to the front of truck 24. It is further used to render box 10 stationary at the front of truck 24, when it is placed within one of the roller guide channels. One end of pole 26, when in the above mentioned condition, engages with a front side of box 20, and the opposite end engages with the inside surface of the tailgate 28 of truck 24.

In use, box 10 is normally supported by rollers 16 in their channels 17 at the front of truck 24, and is rolled rearward in channels 17, by pulling frame 11 thereof, by means of the hook 17 on pole 26, so as to prevent its user from having to climb in and out of truck 24 for placing or removing tools, etc. When it is desired for box 10 to be in the front of the truck, it is pushed to the front by means of the pole 26, and when the truck 24 is to be operated, pole 26 is replaced in one of the channels 17, between the frame 11 and the tailgate 28 of truck 24.

Referring now to FIG. 2 of the drawing, box 10 is modified to include a cover or door 29, which is optional. Door 29 is secured to one side of a piano hinge 30 at its bottom, and the opposite side of hinge 30 is suitably secured to the front bottom member 12 of frame 11. An optional chain 31 is secured to each side of the top of the door frame 32, in a suitable manner, and the opposite ends of chains 31 are suitably secured to the top of the sidemost front members 13 of frame 11. A plywood panel 33 is fixedly secured within frame 32 of door 29, in a suitable manner, and a suitable key lock 34 is provided in door 29 for locking box 10.

In use, door 29 is pivoted open on hinge 30, and is supported by the chains 31, and when closed, is locked by means of lock 34.

Referring now to FIGS. 6 and 7 of the drawings, a roller channel adapter 35 is provided, which is used for installing and removing the tool box 10, if a truck bed cap is used. Adapter 35 is of similar shape, in crosssectional configuration, as channel 17, and aligns with 17 when it is in its down position. However, one end is pivotally received on a suitable fastener 36, which is secured to the inside of one side of a truck 24. An open top and closed bottomed bracket 37 is suitably welded to the side 23 of truck 24, at the rear end of channel 17, and serves to receive and support the opposite end of adapter 35, enabling the roller 16 of box 10 to continue towards the tailgate 28 of truck 24, and adapter 35 is employed as a pair. One is employed at the rear end of each channel 17.

In use, the adapters 35 are grasped by the operator and pivoted upwards from the brackets 37, and the rollers 16 of tool box 10 are then free in the adapter 35 area, thus enabling the operator to remove box 10 from the truck, and also enables the rollers 16 of box 10 to be placed in the channels 17 for installation of box 10.

After removing or placing the box 10 in its channels 17, the operator then pivots adapters 35 to their full downward condition in the brackets 37, for full free travel of rollers 16.

While various changes may be made in the detail construction, it is understood that such changes will be within the spirit and scope of the present invention, as is defined by the appended claims.

I claim:

1. A rolling tool box, comprising, in combination, a frame and a plurality of flat panels mounted around said frame forming a rectangular six-sided enclosure for storing tools therewithin, and means for slidably supporting said tool box between opposite side walls of an automotive truck freight bed so as to slide said tool box between a forward end and a tailgate rear end of said bed; said box having a pivotable acess door on a wall facing said tailgate rear end for placement and removal of said tools when in said tool box; and said means comprising roller plates affixed on opposite side walls of said tool box, a plurality of sidewardly extending roller shafts supported on said roller plates and each carrying a rotatable roller; and a roller-supporting track mounted on an inner side of each said freight bed side wall, each said track comprising a fixed roller-guide channel receiving said rollers, and an adapter adjacent a rear end of said channel, said adapter comprising a pivotable channel for receiving said roller, each said pivotable channel being pivoted at its closed rear end on a fastener affixed on said bed side wall, said pivotable channel being pivotable upwardly from a horizontal position aligned with said fixed channel; and a separate pole having a hook on one end for pulling or pushing said box along said tracks, and said pole being stored inside one said channelled track when not in use, for locking said box from sliding.

* * * * *